(12) United States Patent  
Gotou et al.

(10) Patent No.: US 7,340,946 B2
(45) Date of Patent: Mar. 11, 2008

(54) METHOD AND DEVICE FOR INSPECTING TIRE

(75) Inventors: Takahiro Gotou, Kodaira (JP); Hiroki Kunitake, Kodaira (JP); Yuuichi Waragai, Kodaira (JP); Kenji Kouyama, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 288 days.

(21) Appl. No.: 10/497,486

(22) PCT Filed: Dec. 4, 2002

(86) PCT No.: PCT/JP02/12724

§ 371 (c)(1),
(2), (4) Date: Jul. 13, 2005

(87) PCT Pub. No.: WO03/048718

PCT Pub. Date: Jun. 12, 2003

(65) Prior Publication Data

US 2007/0084275 A1   Apr. 19, 2007

(30) Foreign Application Priority Data

Dec. 4, 2001  (JP) ............................. 2001-370539

(51) Int. Cl.
*G01M 17/02* (2006.01)
(52) U.S. Cl. ........................................ 73/146
(58) Field of Classification Search ........ 73/146–146.8
See application file for complete search history.

(56) References Cited

U.S. PATENT DOCUMENTS

| | | | |
|---|---|---|---|
| 3,698,233 A * | 10/1972 | Braden et al. ............... 73/146 |
| 4,004,693 A * | 1/1977 | Tsuji et al. ................. 209/538 |
| 4,763,515 A | 8/1988 | Pielach et al. | |
| 5,883,304 A | 3/1999 | Kokubu et al. | |
| 6,269,689 B1 * | 8/2001 | Alexander ................... 73/146 |
| 6,386,025 B2 * | 5/2002 | Alexander ................... 73/146 |
| 6,513,372 B2 * | 2/2003 | Anno et al. ................... 73/146 |
| 6,546,635 B1 * | 4/2003 | Gerdes ..................... 33/203.13 |

FOREIGN PATENT DOCUMENTS

| | | |
|---|---|---|
| JP | A 63-67542 | 3/1988 |
| JP | A 02-171632 | 7/1990 |
| JP | A 05-187952 | 7/1993 |
| JP | A 11-014490 | 1/1999 |
| JP | A 2000-329658 | 11/2000 |

* cited by examiner

*Primary Examiner*—Andre J. Allen
*Assistant Examiner*—Jermaine Jenkins
(74) *Attorney, Agent, or Firm*—Oliff & Berridge, PLC

(57) ABSTRACT

A method and a device for inspecting a tire, the method comprising the steps of, in a rim assembly station (G) separated from an inspection station (K) having a tire inspector (58) installed thereon, forming a rim/tire assembly (44) in a setup by assembling one side and the other side rims (19) and (20) with an inspected tire (15) and, when an inspection is performed, transforming the rim/tire assembly (44) from the rim assembly station (G) to the tire inspector (58) on the inspection station (K), whereby a preparatory operation time in the tire inspector (58) can be shortened to shorten a cycle time.

11 Claims, 3 Drawing Sheets

METHOD AND DEVICE FOR INSPECTING TIRE

FIELD OF THE INVENTION

The present invention relates to a method and a device for inspecting a tire which inspects a tire while rotating a tire to be inspected which is mounted to a rim.

BACKGROUND ART

As a conventional method/device for inspecting a tire, the one described in the Japanese Unexamined Patent Publication No. 5-187952, for example, is known. In this, after a tire to be inspected is carried in between an upper and a lower rims of a uniformity machine (tire inspecting machine), the lower rim is raised and the lower rim is attached to a lower bead portion of the tire to be inspected, and even after this attachment, the lower rim is further raised till the upper rim is attached to an upper bead portion of the tire to be inspected. Then, after an internal pressure is filled between the tire to be inspected and the upper/lower rims, the tire to be inspected is inspected while rotating the tire to be inspected, the lower and the upper rims integrally around a tire center shaft.

However, in such a conventional method/device for inspecting a tire, attachment of the tire to be inspected to the upper/lower rims and inflation with internal pressure as preparation for inspection were carried out in the uniformity machine, and though the time for inspection itself is short, a cycle time from carrying-in of the tire to be inspected to next carrying-in of the tire to be inspected gets longer, which results in a problem that work efficiency is lowered.

This invention has an object to provide a method and device for inspecting a tire which improves work efficiency of inspection by carrying out attachment of the tire to be inspected to a rim in setup.

DISCLOSURE OF THE INVENTION

This object can be achieved, first, by a tire inspecting method provided with a process in which, at a rim assembly station, one side rim is attached to one side bead portion of a tire to be inspected and the other side rim to the other side bead portion, respectively, and then, these one side rim and the other side rim are connected to each other so as to form a rim/tire assembly, a process for conveying the rim/tire assembly to a tire inspecting machine installed at an inspection station, and a process, after connecting the rim/tire assembly to a rotation shaft of the tire inspecting machine, for inspecting the tire to be inspected while rotating the rotation shaft and the rim/tire assembly integrally.

Secondly, it can be achieved by a tire inspecting device provided with a tire inspecting machine having an attaching means for attaching one side rim to one side bead portion of a tire to be inspected and the other rim to the other side bead portion by bringing them close to each other, respectively, a connecting means for connecting the one side and the other side rims attached, respectively, to the one side and the other side bead portions to each other so as to form a rim/tire assembly, and a rotation shaft connected to the rim/tire assembly for carrying out inspection of the tire to be inspected while rotating the rotation shaft and the rim/tire assembly integrally, and a conveying means for conveying the rim/tire assembly to the tire inspecting machine.

First, at the rim assembly station, after the one side rim is attached to the one side bead portion of the tire to be inspected and the other side rim to the other side bead portion, respectively, by the attaching means, the rim/tire assembly is formed by connecting these one side and the other side rims to each other with the connecting means.

Next, the rim/tire assembly so formed is conveyed by the conveying means to the tire inspecting machine installed at the inspection station.

Also, after the rim/tire assembly is connected to the rotation shaft of the tire inspecting machine at this inspection station, the tire to be inspected is inspected while rotating the rotation shaft and the rim/tire assembly integrally.

In this way, by carrying out rim assembly of one side and the other side rims with the tire to be inspected so as to form the rim/tire assembly in setup at a rim assembly station, different from the inspection station where the tire inspecting machine is installed as well as by conveying the rim/tire assembly form the rim assembly station to the inspection station (tire inspecting machine) for inspection, time for preparation work at the tire inspecting machine is made short and the cycle time is reduced, which results in improvement of work efficiency. And such an action can be easily obtained by using the above tire inspecting device.

Here, if internal pressure is filled between the tire to be inspected and the one side and the other side rims during the period from formation of the rim/tire assembly to conveying, preparation work of inflation with internal pressure can also be carried out in setup, which can further improve work efficiency.

Also, when a technique to inflate with internal pressure and to improve rim fitting performance between the one side and the other side rims and the tire to be inspected is to be used, warming up of inspection can be performed in the setup, which can further improve work efficiency.

Furthermore, when tire inspecting machines for carrying out different types of inspection are arranged at a plurality of inspection stations, if inspection is made by sequentially conveying the rim/tire assembly as it is to these inspecting machines for carrying out inspection, equipment at the rim assembly station can be shared, by which space and energy of the equipment can be saved.

And also, if the rim/tire assembly which has been inspected by the tire inspecting machine is conveyed to a rim disassembly station and internal pressure is exhausted at the rim disassembly station while the one side and the other side rims are removed from the tire to be inspected, post work such as exhaustion of internal pressure and rim disassembly can be also performed in a separate setup, which can further improve work efficiency.

BEST MODE FOR CARRYING OUT THE INVENTION

Figure 1:
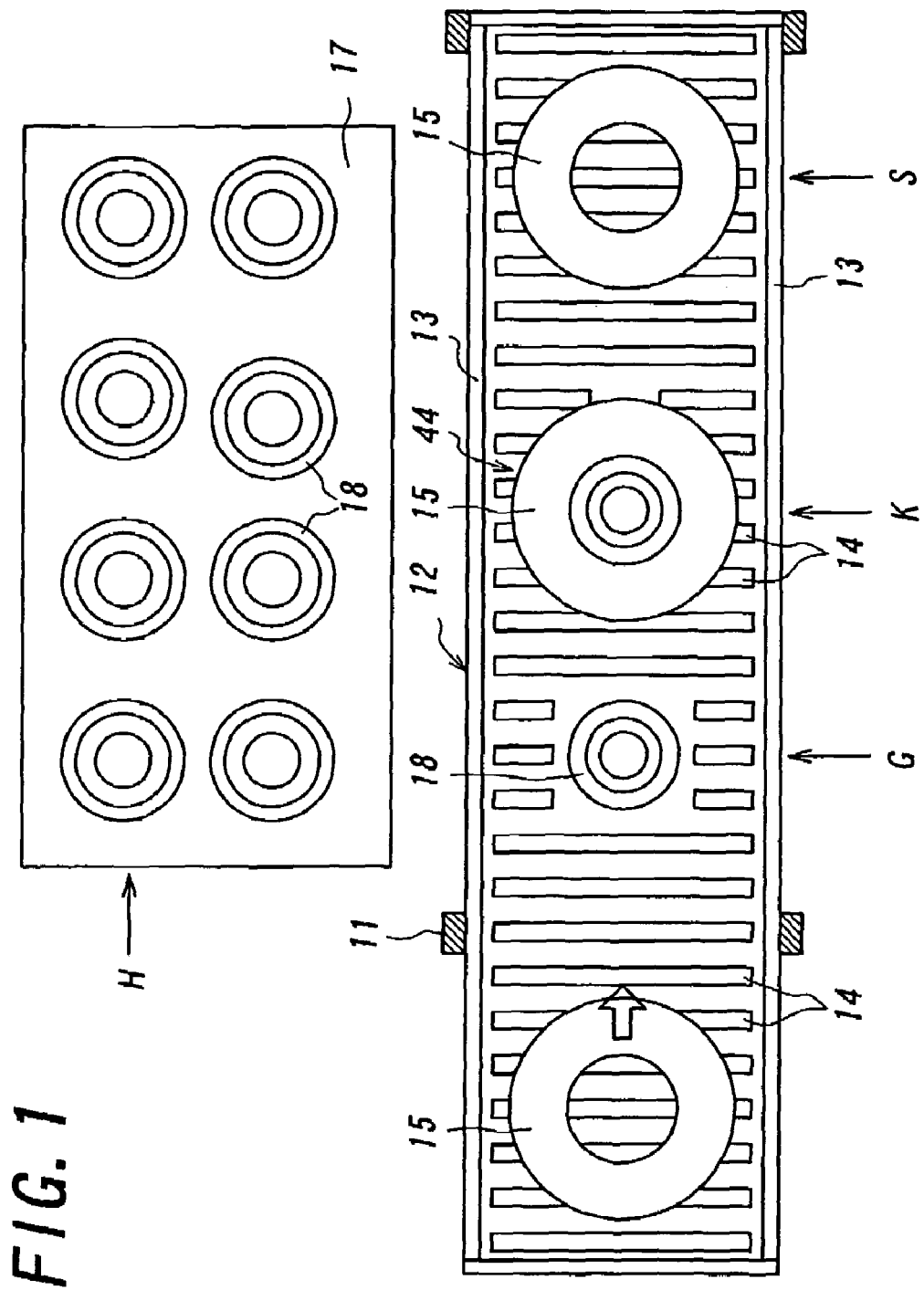
FIG. 1 is a cross-sectional plan view showing a first embodiment of the present invention.
Figure 2:
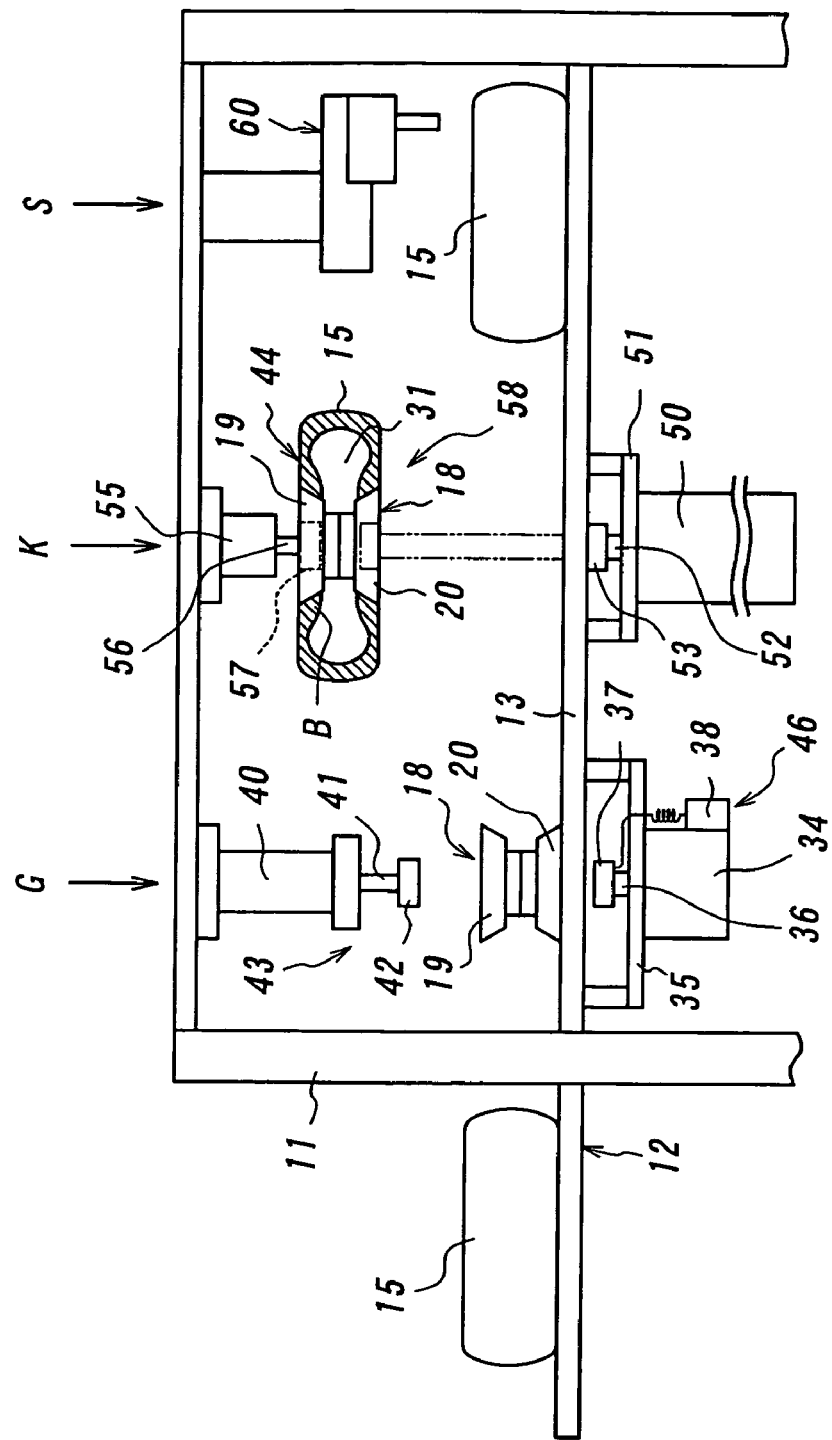
FIG. 2 is its partially taken-out front view.

In FIGS. 1 and 2, 11 indicate a fixed frame. To this fixed frame 11, a roller conveyer 12 as a horizontal conveying means extending in the right-and-left direction is mounted, and this roller conveyer 12 has a conveyer frame 13 extending in the longitudinal direction (right-and-left direction) and a large number of rollers 14 rotatably supported by the conveyer frame 13 and separated with an equal distance in the longitudinal direction as well as extending in the width direction.

And a vulcanized pneumatic tire to be inspected 15, which has been transversely carried onto this roller conveyer 12, is conveyed from the left to the right in the drawing by the rollers 14 driven/rotated by a rotation mechanism, not shown.

In Figs., G, K and S indicate a rim assembly station, an inspection station and a post-processing station, respectively, provided in the order from the upstream of flow in the middle of conveying of the tire to be inspected 15.

In the rear of the roller conveyer 12, a storage station H for rim is provided, and a horizontal storage table 17 is installed at this storage station H. On the storage table 17, a plurality of rims 18 are loaded for holding the tire to be inspected 15 when inspecting the tire to be inspected 15, and each of the rims 18 is comprised by an almost ring-state one side rim 19 and the other side rim 20 made to overlap vertically with each other in close contact.

And at the rim assembly station G, the one side rim 19 is attached to the one side bead portion B of the tire to be inspected 15 and the other side rim 20 to the other side bead portion B, respectively, and when these one side and the other side rims 19 and 20 are connected by a connecting means, not shown, to each other, a sealed space 31 is formed between the tire to be inspected 15, the one side and the other side rims 19, 20, but internal pressure (air) is filled in or exhausted from this space 31.

At this rim assembly station G, a cylinder 34 extending/contracting in the vertical direction is mounted and this cylinder 34 is arranged immediately under the roller conveyer 12 and mounted to the conveyer frame 13 of the roller conveyer 12 through a bracket 35. A gripping mechanism 37 is provided at the tip end of a piston rod 36 of the cylinder 34, and this gripping mechanism 37 can grip the other side rim 20 from inside when it is inserted into the other side rim 20. Also, this gripping mechanism 37 can fill air supplied form an air source 38 in the space 31 when it is gripping the other side rim 20.

A cylinder 40 extending/contracting in the vertical direction is mounted immediately above the cylinder 34, and a head-side end (upper end) of this cylinder 40 is fixed to the fixed frame 11. A gripping mechanism 42 is provided at the tip end of a piston rod 41 of this cylinder 40 and when this gripping mechanism 42 is inserted into the one side rim 19, it can grip the one side rim 19 from inside.

And at this rim assembly station G, by projection of the piston rods 36, 41 of the cylinders 34, 40, the other side and the one side rims 20, 19 gripped by the gripping mechanisms 37, 42 are brought close to the other side and the one side bead portions B of the tire to be inspected 15, respectively, and attached. The cylinder 34, the gripping mechanism 37, the cylinder 40 and the gripping mechanism 42 as a whole constitute an attaching means 43 by bringing the one side rim 19 closer to the one side bead portion B of the tire to be inspected 15 and the other side rim 20 to the other side bead portion B, respectively, for attachment.

When the one side rim 19 is attached to the one side bead portion B of the tire to be inspected 15 and the other side rim 20 to the other side bead portion B, respectively, in this way, these one side and the other side rims 19, 20 are brought close to each other and connected to each other by the connecting means, by which a rim/tire assembly 44 is formed.

When the rim/tire assembly 44 is formed by rim assembly in this way, air is supplied to the space 31 from the air source 38, and the space 31 is inflated with internal pressure. Here, when the gripping mechanism 37 releases the other side rim 20 from gripping, flow-out of the internal pressure from the space 31 is prevented. The air source 38, and the gripping mechanism 37 as a whole constitute a filling means 46 for filling internal pressure between the tire to be inspected 15 and the one side and the other side rims 19, 20 from formation of the rim/tire assembly 44 to conveyance of the rim/tire assembly 44 to the inspection station K, which will be described later.

A trimming means may be also provided at the inspection station K, and in that case, vent spew is cut and removed prior to inspection for the rim/tire assembly for which rim assembly has been finished as mentioned above.

At the inspection station K provided on the right (downstream side) of the rim assembly station G, a cylinder 50 extending/contracting in the vertical direction is installed, and this cylinder 50 is arranged immediately under the roller conveyer 12 and mounted to the conveyer frame 13 of the roller conveyer 12 through a bracket 51.

A rotatable gripping mechanism 53 is provided at the tip end of a piston rod 52 of the cylinder 50, and this gripping mechanism 53 can grip the other side rim 20 from inside when inserted into the other side rim 20. Also, this gripping mechanism 53 can exhaust internal pressure (air) in the space 31 when it is holding the other side rim 20.

Also, at immediately above the cylinder 50, a motor 55 whose center axis is faced vertically is installed, and the upper end of this motor 55 is fixed to the fixed frame 11. A gripping mechanism 57 is provided at the tip end of a rotation shaft 56 of this motor 55, and when this gripping mechanism 57 is inserted into the one side rim 19, it can grip the one side rim 19 from inside.

And at this inspection station K, when the gripping mechanism 57, the rim/tire assembly 44 and the gripping mechanism 53 are rotated integrally by operation of the motor 55, a predetermined inspection such as an appearance inspection, uniformity inspection, etc. is made by a tire inspecting means, not shown, for the tire to be inspected 15.

The above-mentioned cylinder 50, the gripping mechanism 53, the motor 55, the rotation shaft 56, the gripping mechanism 57 and the tire inspecting means as a whole constitute a tire inspecting machine 58 having a rotation shaft 56 connected to the rim/tire assembly 44 for inspecting the tire to be inspected 15 while rotating the rotation shaft 56 and the rim/tire assembly 44 integrally.

And at a post-processing station S provided on the right (downstream side) of the inspection station K, a post-processing machine 60 for carrying out post processing for the tire to be inspected 15 from which the rim has been removed such as an inner surface inspection, etc., for example, is installed, and this post-processing machine 60 is mounted to the fixed frame 11 immediately above the roller conveyer 12.

At this post-processing station S, when the tire to be inspected 15 removed from the rim 18 is conveyed from the inspection station K, post processing is made for the tire to be inspected 15.

Then, action of a first embodiment of the present invention will be explained.

When the rim 18 corresponding to the tire to be inspected 15 is transferred by a transfer means, not shown, from a storage station H to the rim assembly station G, the piston rods 36, 41 of the cylinders 34, 40 are projected, the gripping mechanisms 37, 42 are inserted into the other side and the one side rims 20, 19, and thereafter, these gripping mechanisms 37, 42 grip the other side and the one side rims 20, 19, respectively, from inside. In the meantime, after the transfer means releases the one side and the other side rims 19, 20 from gripping, it returns to the initial position.

Then, when the piston rods 36, 41 of the cylinders 34, 40 are retracted together and the other side rim 20 is moved below the roller conveyer 12 with the one side rim 19 moved above the upper face of the tire to be inspected 15, the roller 14 of the roller conveyer 12 is rotated and the tire to be inspected 15 is carried into the rim assembly station G.

After that, since the piston rods 36, 41 of the cylinder 34, 40 are projected, the other side and the one side rims 20, 19 gripped by the gripping mechanisms 37, 42 are brought close to the other side and the one side bead portions B of the tire to be inspected 15 and attached. At this time, the lower and the upper faces of the one side and the other side rims 19, 20 are brought close to each other, and these one side and the other side rims 19, 20 are connected by the connecting means to each other so as to form the rim/tire assembly 44.

Then, air is supplied from the air source 38 to the space 31, and internal pressure is filled in the space 31. In this way, by filling the internal pressure in the space 31 during the course from formation of the rim/tire assembly 44 to conveyance of the rim/tire assembly 44 to the inspection station K, preparation work of inflation with internal pressure can be carried out in the setup for the inspection work, which can improve work efficiency.

And the tire to be inspected 15 with the space 31 filled with internal pressure in this way is made to stand by there till the tire to be inspected previously carried into the inspection station K has been inspected and carried out from there to the post-processing station S, and at this time, it is favorable that a method is used that the one side and the other side rims 19, 20 are made to well fit to the tire to be inspected 15 so as to improve rim fitting performance, and by this, warm-up of inspection can be carried out in the setup, which improves work efficiency.

Next, immediately before start of conveyance of the tire to be inspected 15 to the inspection station K, the one side and the other side rims 19, 20 are released from gripping by the gripping mechanisms 42, 37, and the piston rods 41, 36 of the cylinders 40, 34 are retracted and the gripping mechanisms 42, 37 are returned to the initial position. At this time, since flow out of the internal pressure from the space 31 is prevented, inspection of the tire to be inspected 15 at the inspection station K thereafter is carried out accurately.

Moreover, by operation of the roller conveyer 12, the rim/tire assembly 44 filled with internal pressure is carried from the rim assembly station G to the inspection station K. The tire to be inspected which has been already inspected is conveyed from the inspection station K to the post-processing station S prior to this carrying-in.

When the rim/tire assembly 44 is carried into the inspection station K in this way, the piston rod 52 of the cylinder 50 is projected and the gripping mechanism 53 is inserted into the other side rim 20, and after that, the gripping mechanism 53 grips the other side rim 20 from inside. Next, when the piston rod 52 of the cylinder 50 is further projected, the rim/tire assembly 44 is lifted till the gripping mechanism 57 on the motor side is inserted into the one side rim 19. At this time, the gripping mechanism 57 grips the one side rim 19 from inside.

When the motor 55 is operated after that, the gripping mechanism 57, the rim/tire assembly 44 and the gripping mechanism 53 are rotated integrally. At this rotation, a predetermined inspection such as an appearance inspection, a uniformity inspection, etc., for example, is carried out for the tire to be inspected 15 by the tire inspecting means, not shown.

Vent spew can be cut and removed before such inspection for the tire to be inspected 15 by the trimming means, not shown.

Here, by rim assembly of the one side and the other side rims 19, 20 and the tire to be inspected 15 in the setup at the rim assembly station G which is different from the inspection station K where the tire inspecting machine 58 is installed, the rim/tire assembly 44 is formed and the rim/tire assembly 44 is conveyed from the rim assembly station G to the inspection station K (tire inspecting machine 58) before inspection, and time for preparation work at the tire inspecting machine 58 is made short and a cycle time is reduced, which can improve work efficiency.

When inspection for the tire to be inspected 15 is finished, after the internal pressure (air) in the space 31 is exhausted, connection between the one side and the other side rims 19, 20 by the connecting means is released. Next, the piston rod 52 of the cylinder 50 is retracted so as to lower only the other side rim 20 and the tire to be inspected 15 gripped by the gripping mechanism 53, and the tire to be inspected 15 is loaded on the roller conveyer 12. Next, after releasing the other side rim 20 from gripping by the gripping mechanism 53, the piston rod 52 is retracted, and the gripping mechanism 53 is separated downward from the other side rim 20.

In the meantime, the tire to be inspected 15 which has been inspected is conveyed from the inspection station K to the post-processing station S by rotating the roller 14 of the roller conveyer 12, and post-processing such as marking is carried out for the tire to be inspected 15 by a post-processing machine 60 at the post-processing station S.

At this time, at the inspection station K, the other side rim 20 is lifted till it is brought into close contact with the one side rim 19 by projection of the piston rod 52 of the cylinder 50, these one side and the other side rims 19, 20 are gripped by the transfer means, not shown, while the gripping mechanisms 53, 57 release the other side and the one side rims 20, 19 from gripping. After that, when the piston rod 52 is retracted, the transfer means transfers the rim 18 to the storage station H (on the storage table 17).

Figure 3:
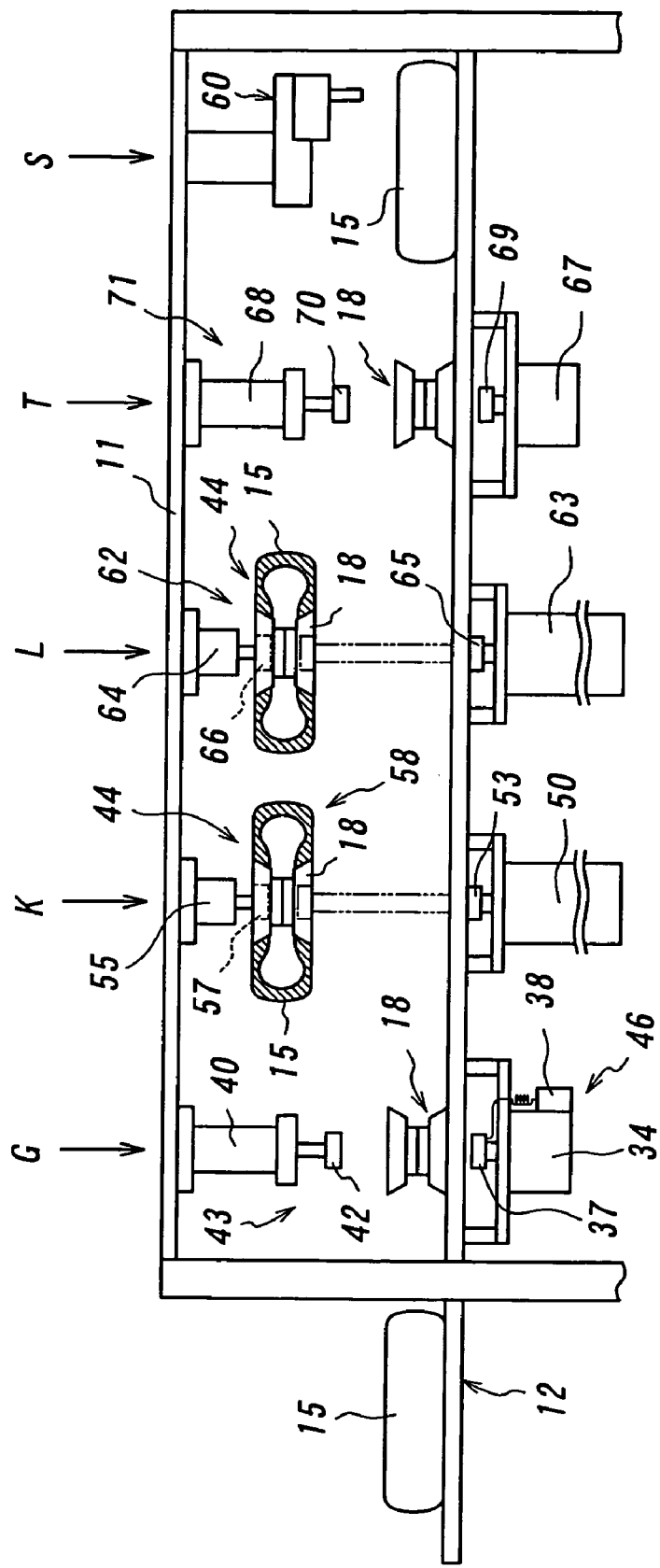
FIG. 3 is a partially taken-out front view showing a second embodiment of the present invention.

FIG. 3 is a view showing a second embodiment of the present invention. In this embodiment, between the inspection station K and the post-processing station S, an inspection station L for carrying out an inspection different from that at the inspection station K, balance inspection, for example, is provided, and between the inspection station L and the post-processing station S, a rim disassembly station T for removing the rim 18 from the tire to be inspected 15 is provided. Here, at the inspection station L, a cylinder 63, a motor 64, gripping mechanisms 65, 66 in the constitution similar to that of the inspection station K are provided, and the tire inspecting means such as a balance inspecting machine, not shown, is provided. And the rim/tire assembly 44 which has been inspected at the inspection station K is conveyed by the roller conveyer 12 as it is to this inspection station L, and inspection similar to that at the inspection station K is carried out.

The tire inspecting machines 58, 62 for carrying out different inspections are arranged in this way at the plural inspection stations K, L, respectively, and if the rim/tire assembly 44 is conveyed sequentially as it is to these tire inspecting machines 58, 62 for inspection, equipment at the rim assembly station G can be shared, by which space and energy of the equipment can be saved.

Either of inspection such as uniformity and inspection such as balance may be executed first, but if a tire is to be buffed and polished or the like after uniformity inspection or the like, for example, it is favorable that balance inspection or the like is carried out after that.

In the meantime, at the rim disassembly station T, a rim disassembly means 71 consisting of cylinders 67, 68 and gripping mechanism 69, 70 similar to the rim assembly station G is installed. And at this rim disassembly station T, when the tire to be inspected 15 for which inspection has been finished at the inspection station L is conveyed by the roller conveyer 12, the other side and the one side rims 20, 19 are gripped by the gripping mechanisms 69, 70, and then, internal pressure (air) in the space 31 is exhausted and then, connecting between the one side and the other side rims 19, 20 by the connecting means is released.

Next, the cylinder 67 is operated and the gripping mechanism 69 and the other side rim 20 are lowered, while the cylinder 68 is operated and the gripping mechanism 70 and the one side rim 19 are raised so that the rim 18 is removed from the tire to be inspected 15 and disassembled. After that, the tire to be inspected 15 is conveyed by the roller conveyer 12 to the post-processing station S, while the cylinders 67, 68 are operated and the other side rim 20 and the one side rim 19 are raised and lowered, respectively, till they are brought into close contact. After that, the transfer means grips these one side and the other side rims 19, 20, and when the gripping mechanisms 69, 70 release the other side and the one side rims 20, 19 from gripping, the transfer means transfers the rim 18 onto the storage table 17.

If the rim/tire assembly 44 which has been inspected by the tire inspecting machines 58, 62 is conveyed to the rim disassembly station T, the internal pressure is exhausted at the rim disassembly station T and the one side and the other side rims 19, 20 are removed from the tire to be inspected 15, cleanup work such as exhaustion of internal pressure and rim disassembly can be carried out in setup different from the inspection work, which can improve work efficiency.

In the above description, in order to remove influence of characteristics unique to each of the plurality of rims 18 stored at the rim storage station H such as static and dynamic balance, rim contour shape, roundness, etc., for example, onto inspection accuracy of a tire, it is preferable that unique influences caused by the rim in use are considered for the inspection results and removed from the inspection results by mounting a barcode or the like recording information unique to each of the rims on the rim or by managing information unique to each of the rim by computer.

INDUSTRIAL APPLICABILITY

As mentioned above, according to the present invention, work efficiency of inspection can be improved by attaching a tire to be inspected onto a rim in prior setup.

The invention claimed is:

1. A tire inspecting method comprising:
    attaching one side rim to one side bead portion of a tire to be inspected and attaching an other side rim to an other side bead portion, respectively, at a rim assembly station;
    connecting the one side rim and the other side rim to each other at the rim assembly station so as to form a rim/tire assembly;
    conveying the rim/tire assembly to a tire inspecting machine installed at an inspection station;
    connecting the rim/tire assembly to a rotation shaft of the tire inspecting machine; and
    inspecting the tire to be inspected while rotating the rotation shaft and the rim/tire assembly integrally.

2. A tire inspecting method in claim 1, wherein internal pressure is filled between the tire to be inspected and the one side and the other side rims during the course from formation to conveyance of the rim/tire assembly.

3. A tire inspecting method in claim 2, wherein a technique for filling the internal pressure and improving rim fitting performance between the one side and the other side rims and the tire to be inspected is used.

4. A tire inspecting method in claim 3, wherein, a plurality of tire inspecting machines for carrying out different types of inspection are installed at a plurality of inspection stations, and
    the rim/tire assembly is sequentially conveyed to the plurality of tire inspecting machines as it is for inspection.

5. A tire inspecting method in claim 3, wherein the rim/tire assembly which has been inspected by the tire inspecting machine is conveyed to a rim disassembly station and the internal pressure is exhausted at the rim disassembly station, while the one side and the other side rims are removed from the tire to be inspected.

6. A tire inspecting device provided with a tire inspecting machine comprising:
    an attaching means for attaching one side rim to one side bead portion of a tire to be inspected and an other side rim to an other side bead portion by bringing them close to each other, respectively;
    a connecting means for connecting the one side and the other side rims attached, respectively, to the one side and the other side bead portions to each other so as to form a rim/tire assembly;
    a rotation shaft connected to the rim/tire assembly for carrying out inspection of the tire to be inspected while rotating the rotation shaft and the rim/tire assembly integrally, and a conveying means for conveying the rim/tire assembly to an inspection station of the tire inspecting machine.

7. A tire inspecting method in claim 2, wherein, a plurality of tire inspecting machines for carrying out different types of inspection are installed at a plurality of inspection stations, and
    the rim/tire assembly is sequentially conveyed to the plurality of tire inspecting machines as it is for inspection.

8. A tire inspecting method in claim 2, wherein the rim/tire assembly which has been inspected by the tire inspecting machine is conveyed to a rim disassembly station and the internal pressure is exhausted at the rim disassembly station, while the one side and the other side rims are removed from the tire to be inspected.

9. A tire inspecting method in claim 1, wherein, a plurality of tire inspecting machines for carrying out different types of inspection are installed at a plurality of inspection stations, and
    the rim/tire assembly is sequentially conveyed to the plurality of tire inspecting machines as it is for inspection.

10. A tire inspecting method in claim 9, wherein the rim/tire assembly which has been inspected by the plurality of tire inspecting machines is conveyed to a rim disassembly station and internal pressure is exhausted at the rim disassembly station, while the one side and the other side rims are removed from the tire to be inspected.

11. A tire inspecting method in claim 1, wherein the rim/tire assembly which has been inspected by the tire inspecting machine is conveyed to a rim disassembly station and internal pressure is exhausted at the rim disassembly station, while the one side and the other side rims are removed from the tire to be inspected.

* * * * *